(12) United States Patent
Leaming (10) Patent No.: US 7,044,390 B2
(45) Date of Patent: May 16, 2006

(54) SMART CARD EMULATOR AND RELATED METHODS USING BUFFERING INTERFACE

(75) Inventor: Taylor J. Leaming, Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 185 days.

(21) Appl. No.: 10/452,356

(22) Filed: Jun. 2, 2003

(65) Prior Publication Data

US 2004/0238644 A1 Dec. 2, 2004

(51) Int. Cl.
*G06K 19/06* (2006.01)

(52) U.S. Cl. .................................................. 235/492

(58) Field of Classification Search ............... 235/492, 235/380; 710/100, 102, 62; 709/217, 106; 713/172, 201
See application file for complete search history.

(56) References Cited

U.S. PATENT DOCUMENTS

| | | | |
|---|---|---|---|
| 5,847,372 A | 12/1998 | Kreft | 235/492 |
| 5,991,546 A | 11/1999 | Chan et al. | 395/882 |
| 6,070,208 A | 5/2000 | Brief | 710/104 |
| 6,122,676 A | 9/2000 | Brief et al. | 710/9 |
| 6,168,077 B1 | 1/2001 | Gray et al. | 235/375 |
| 6,173,355 B1 | 1/2001 | Falik et al. | 710/129 |
| 6,219,736 B1* | 4/2001 | Klingman | 710/315 |
| 6,311,294 B1 | 10/2001 | Larky et al. | 714/44 |
| 6,353,867 B1 | 3/2002 | Qureshi et al. | 710/129 |
| 6,439,464 B1 | 8/2002 | Fruhauf et al. | 235/492 |
| 6,516,357 B1* | 2/2003 | Hamann et al. | 710/2 |
| 6,625,472 B1 | 9/2003 | Farazmandnia et al. | 455/557 |
| 6,760,333 B1* | 7/2004 | Moody et al. | 370/395.1 |
| 6,769,622 B1* | 8/2004 | Tournemille et al. | 235/492 |
| 6,941,285 B1* | 9/2005 | Sarcanin | 705/67 |
| 2001/0034593 A1 | 10/2001 | Cooke et al. | 703/14 |
| 2002/0011516 A1* | 1/2002 | Lee | 235/380 |
| 2002/0046016 A1 | 4/2002 | Debling | 703/28 |
| 2002/0065646 A1 | 5/2002 | Waldie et al. | 703/26 |
| 2002/0065966 A1 | 5/2002 | Brief | 710/100 |
| 2002/0066791 A1 | 6/2002 | Leydier et al. | 235/492 |
| 2002/0078283 A1 | 6/2002 | Purcell et al. | 710/109 |
| 2003/0037225 A1 | 2/2003 | Deng et al. | 712/227 |
| 2004/0006584 A1* | 1/2004 | Vandeweerd | 709/107 |

FOREIGN PATENT DOCUMENTS

| | | |
|---|---|---|
| WO | 99/49415 | 9/1999 |
| WO | 01/96990 | 12/2001 |

* cited by examiner

*Primary Examiner*—Karl D. Frech
*Assistant Examiner*—Edwyn Labaze
(74) *Attorney, Agent, or Firm*—Lisa K. Jorgenson; Christopher F. Regan (57) ABSTRACT

An emulator for a smart card device and associated method have at least two virtual components as functional blocks for a smart card device and operative in different clock domains. A functional buffering block is operative for communicating with the functional blocks and buffering between the functional blocks and allowing emulation.

26 Claims, 3 Drawing Sheets

SMART CARD EMULATOR AND RELATED METHODS USING BUFFERING INTERFACE

FIELD OF THE INVENTION

This invention relates to the field of information processing and storage, and more particularly, to smart card emulators and related methods.

BACKGROUND OF THE INVENTION

Smart cards are becoming increasingly more popular for security and personal identification applications. For example, smart cards are currently used for storing sensitive data such as medical records, banking information, and similar data requirements. In perhaps their most common form, smart cards have a card body that resembles a credit card in size, shape, and thickness, and may be made out of similar materials, for example, plastic. Rather than having a magnetic stripe to store sensitive information (e.g., account numbers, user identification, etc.) as standard credit cards do, smart cards generally include an integrated circuit (IC). The IC not only includes a non-volatile memory for storing sensitive data, but it may also include a microprocessor for processing this data and communicating with a host device via a card reader, for example. Not only can smart cards store more information than magnetic stripe cards, but also they have much greater functionality.

Various protocols have emerged to standardize the operation and communications of devices such as smart cards. One of the earliest of these was developed by the International Organization for Standardization (ISO) and is known as the ISO 7816-X protocol. In particular, this protocol is set forth in ISO documents ISO 7816-1 (Physical Characteristics), ISO 7816-2 (Dimensions and Locations of Contacts), ISO 7816-3 (Electronic Signals and Transmission Protocols), ISO 7816-10 (Electronic Signals and Answer to Reset for Synchronous Cards), and ISO 7816-12 (USB Interface) for example, all of which are hereby incorporated herein in their entirety by reference.

Furthermore, in response to the increasing popularity of the universal serial bus (USB) architecture, increasing numbers of smart cards continue to be developed which operate in accordance with the USB protocol. This protocol is set forth in the Universal Serial Bus Specification, Revision 2.0, Apr. 27, 2000, published by USB Implementers Forum, Inc., which is hereby incorporated herein in its entirety by reference. The USB architecture is particularly advantageous because it provides a standard "plug and play" interface for devices external to a computer, for example. External peripheral devices can be relatively quickly and easily installed and removed from a host device, e.g., a computer, without having to reboot or power down the computer.

Most product development cycles for complex computing systems or devices require a functional equivalent of the product before the final product is available. This functional equivalent is typically referred to as an emulator, or hardware emulator (HWE). The HWE allows the application developers for the product to develop and debug software applications for the device while the product engineers finalize and test the physical circuitry and/or components of the product.

With respect to smart cards, a HWE emulator is commonly used to develop, test, and debug new applications which will ultimately become embedded in the final smart card integrated circuit. The HWE should provide functionality that matches as closely as possible the real-world functionality of the end product (e.g., a smart card integrated circuit). This emulation should also be applicable to complicated dual-mode smart cards, such as dual ISO/USB smart cards. One such dual mode smart card is described in U.S. Pat. No. 6,439,464 to Fruhauf et al., assigned to the assignee of the present invention, and which is hereby incorporated herein in its entirety by reference.

Electronic Design Automation (EDA) software tools are often used to simulate a smart card (or other) chip design prior to prototyping or production. Designers often use a Hardware Description Language (HDL), such as Verilog® or VHDL, to define functional components and decompose them into smaller components. Software routines are placed and routed into logic cells at specific coordinate locations in a circuit layout.

Functional blocks, also called virtual component (VC) blocks, virtual components, or IP blocks, are often used by designers as pre-designed circuit functions. In many cases, these functional blocks are pre-hardened or semi-hardened circuit designs in software form that are re-used or recycled into larger circuit designs. The use of virtual component blocks reduces overall circuit design time and increases the speed a final design can reach market. These functional blocks as virtual components can also be pre-tested and verified from logical and functional standpoints.

Emulators often use functional blocks and a baseline architecture with the Virtual Socket Interface (VSI) for any "system-on-a-chip" (SoC) solution. Some functional blocks are specifically designed for use with a particular IC, and other functional blocks had been designed for use with other IC's and obtained from internal and/or external sources.

The Virtual Socket Interface (VSI) Alliance™ Architecture Document Version 1.0, the disclosure which is hereby incorporated by reference in its entirety, specifies the hardware and software interfaces, formats and design practices for creating functional blocks to enable efficient and accurate integration, verification and testing of multiple blocks on a single piece of silicon. The VSI standard is operative with an HDL description to allow IC design to be done using a component based solution. Virtual components as functional blocks are used in the design environment, and more particularly, a virtual socket design environment. Typically, virtual components can be soft, firm or hard. Usually a virtual component is a functional block designed to a set of specifications having an output that is a standard format with a pre-defined set of characteristics to simplify integration and verification.

As noted before, smart card integrated circuits as designed for preferred USB smart card devices (USD) require a design for a functionally equivalent representative well in advance of the final silicon product. It is expected that any emulated version will not necessarily work at the same clock rate of the final silicon. Due to the nature of today's emulation tools and environments, however, it is possible to emulate complete products only at a mere fraction of their silicon form. This, of course, is dependent on the nature and complexity of the design, and the capability of the emulation tools to implement the design into the resources of the emulator.

For example, an emulator which uses large arrays of Field Programmable Gate Array (FPGA) devices into which the target HDL design is implemented, may be capable of operating at only a few hundred kilohertz (KHz), predominantly at the digital portions of the design. Analog portions must usually be implemented in functionally equivalent "attachments" to the main emulator.

Even custom designed emulator packages suffer similar problems. For situations where an interface to the outside world must function at real world speeds in order to be useful, this poses technical challenges. One drawback occurs when top level functional blocks or sub-blocks or virtual sub-components, must be emulated, but must also function in their own clock domains. These domains are typically separated by a wide margin in emulation for various reasons, but this margin is manageable in the final at-speed silicon product. For emulation purposes, the top level design does not work.

Usually, the design must be modified, which also increases the risk, however, of emulating a design which is not faithful to the original design. Thus, there are now two different designs: (1) a first design will go to fabrication; and (2) a second design will go to an emulator, and as a result, may be delivered to a key customer for early development work.

SUMMARY OF THE INVENTION

It is therefore an object of the present invention to provide an emulator for smart cards having an interface between functional blocks or virtual components that operate at different clock speeds.

The present invention uses standard off-the-shelf intellectual property as virtual components (functional blocks) and provides an effective transparent wedge of buffering between virtual components (functional blocks) in a design having functional blocks operative in different clock domains. This is accomplished without modifying the design, allowing it to be able to work in an emulation environment. This same design could function in its final silicon implementation, according to its specifications, provided that each of the functional sub-blocks perform according to its design specifications. The asynchronous rift between two or more functional sub-blocks can be handled accordingly.

The present invention adds a flexible and robust asynchronous interface to each top level, functional sub-block as a virtual component and introduces in between these two functional sub-blocks a new functional block as a virtual component to serve as a dynamic buffer. It also has two asynchronous interfaces. The inclusion or exclusion of this functional "buffering" block can be managed by a compile-time flag, with no other modification required to the main design.

The inclusion of this functional buffering block into the design makes it possible for the emulation environment to function properly. It can be rendered in a field programmable gate array (FPGA) or physical adapter card, as required. A virtual component interface (VCI) can be used between functional blocks because of its flexibility and range of operation. When used in an emulation environment, the local logic of the functional buffering block manages the buffer contents and provides a conduit between the virtual components as functional blocks having not only a USB device, but also a custom logic block.

In accordance with the present invention, an emulator for a smart card includes at least two virtual components as functional blocks of the smart card device and operative in different clock domains. A functional buffering block is operative for communicating with the functional blocks and buffering between the functional blocks and allowing emulation. The functional blocks can include asynchronous interfaces for communicating with each other and/or the functional buffering block. These interfaces can include virtual component interfaces.

The functional buffering block can include local logic for managing the buffering between functional blocks. The functional buffering block can be excluded or included for buffering by a compile-time flag. A first functional block can include a USB device core (UDC) and a second functional block in communication therewith can include a custom logic block and bus interface. A synchronization block can synchronize high speed UDC operation. The functional buffering block can also include a plurality of control registers.

A method aspect of the invention allows emulation of a smart card device and comprises the step of buffering data between virtual components as functional blocks for a smart card device and operative in two different clock domains. The step of buffering can include the step of buffering through asynchronous interfaces, including virtual component interfaces between the functional blocks.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention uses standard off-the-shelf intellectual property, such as virtual components as functional blocks or sub-blocks, and provides a transparent wedge of buffering between two functional blocks in a design where the functional blocks function in different clock domains. This is accomplished without modifying the design to allow it to work in an emulation environment. This design can function in its final silicon implementation, according to its specification, provided that each of the functional blocks, for example, as sub-components, performs according to its defined specifications. Any asynchronous rifts between two or more functional blocks or virtual components can be handled by the present invention Different emulation tools can be used in accordance with the present invention.

Figure 3:
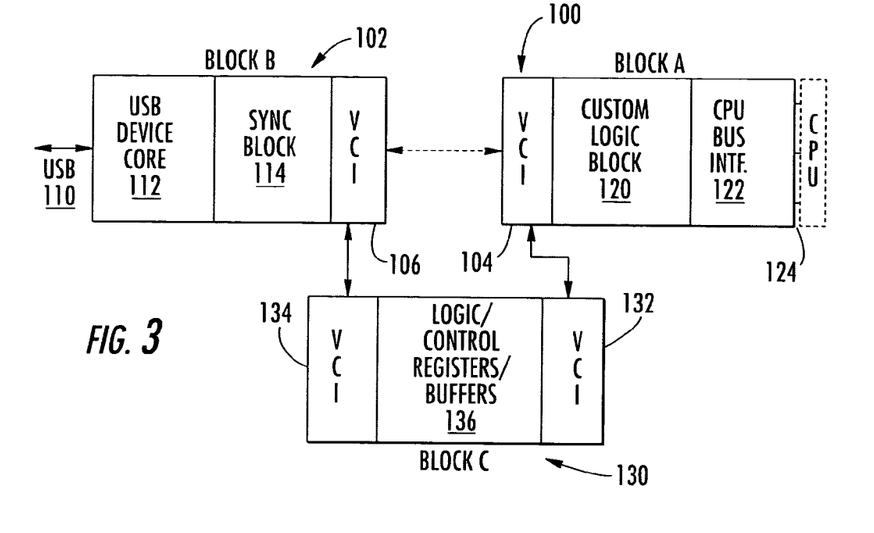
FIG. 3 is a block diagram showing top level functional blocks as virtual components and having a functional buffering block therebetween in accordance with the present invention.

Emulation tools also provide flexible and robust asynchronous interface for each top level functional block or virtual component. Between these blocks, a new functional buffering block serves as a dynamic buffer and includes two asynchronous interfaces as shown in FIG. 3 and described in detail below. The functional buffering block can be managed by a compile-time flag with no other modification required to the main design.

Figure 1:
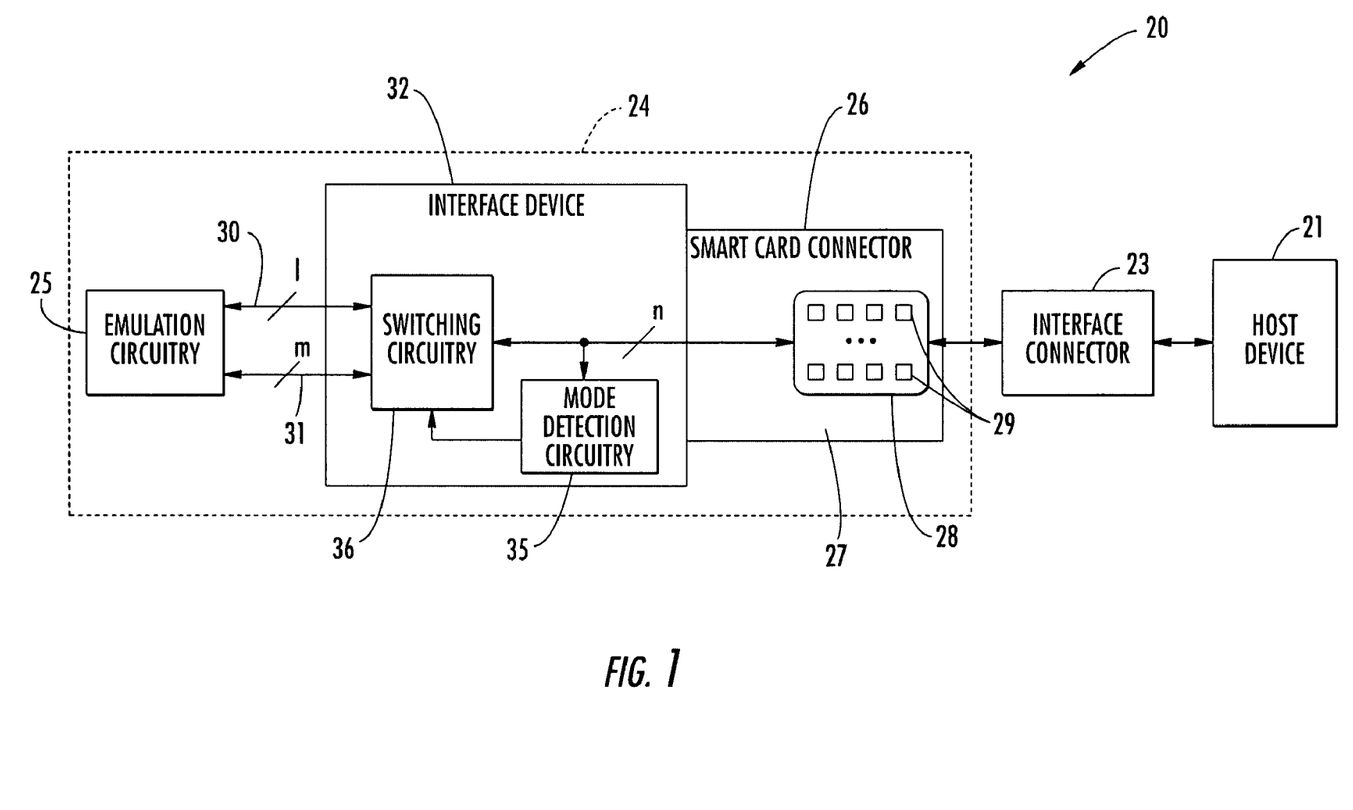
FIG. 1 is a schematic block diagram of a smart card emulation system that could be adapted for use in accordance with the present invention.
Figure 2:
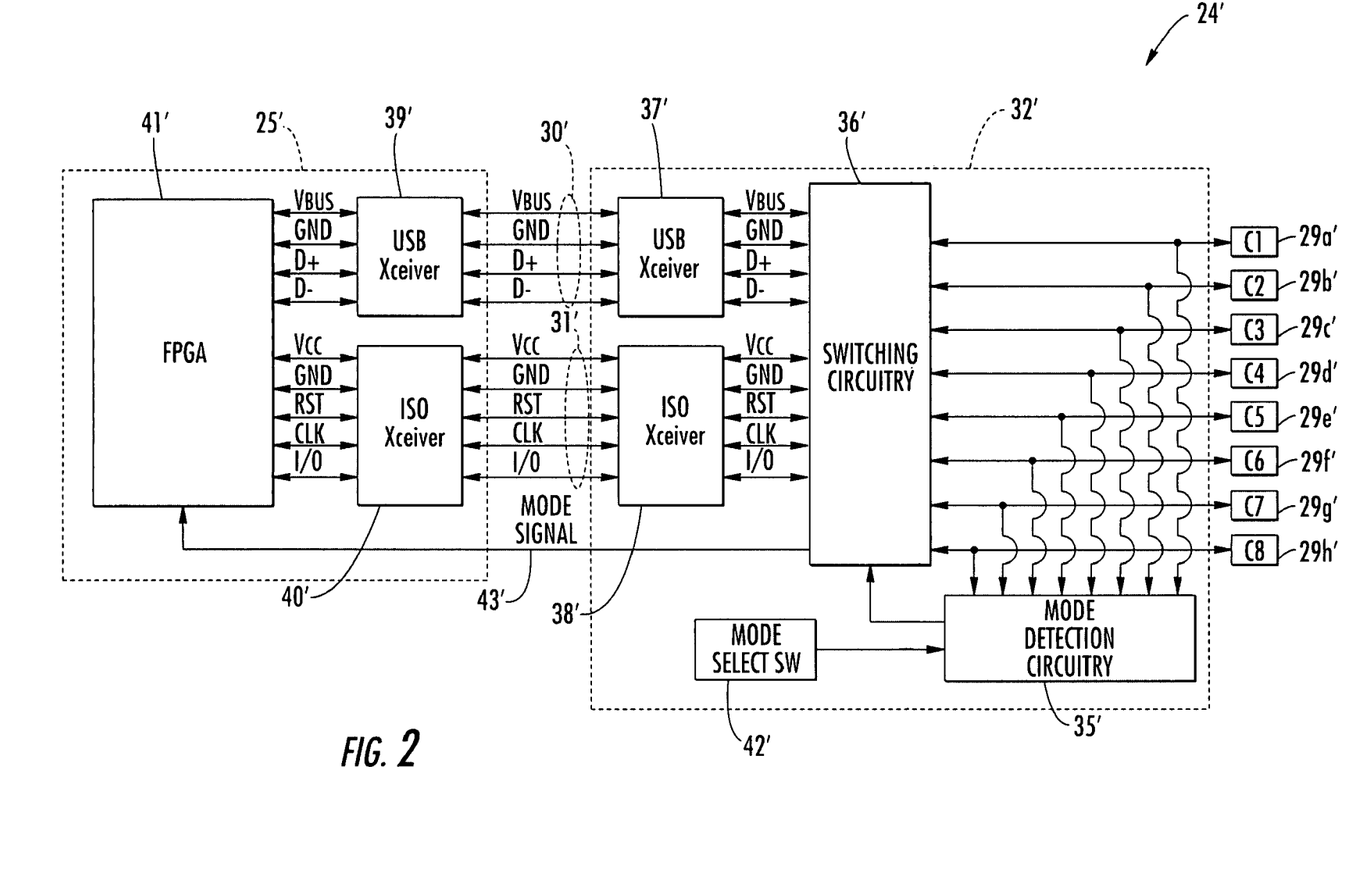
FIG. 2 is a schematic block diagram of a smart card emulator illustrated in FIG. 1 that could also be adapted for use in the present invention and for use with a dual-mode ISO/USB embodiment.

For purposes of description, FIGS. 1 and 2 describe a smart card emulation system 20 that can be adapted for use in accordance with the present invention. This emulation system 20 as described is particularly adapted for use with emulation of dual mode smart card systems as described before. After describing the emulation system 20 shown in FIGS. 1 and 2, there follows a detailed description of the functional blocks and buffering shown in FIGS. 3 and 4, in accordance with the present invention.

The smart card emulation system 20 shown in FIG. 1 includes a host device 21, an interface connector 23 connected to the host device, and a multi-mode smart card emulator 24 for communicating with the host device via the smart card reader. Generally speaking, the host device 21 will be a computer of some type, which could be a personal computer (PC), laptop, or other suitable device for performing tests on, or developing applications for use on, the smart card emulator 24.

The interface connector 23 is of a type compatible with the desired operating protocol or mode which the smart card emulator 24 is to emulate (e.g., an ISO 7816 type card reader, a USB type card reader, etc.). While a single interface connector is illustratively shown for clarity of illustration, multiple connectors 23 may be connected to the host device 21 for each of the operational modes of the smart card emulator 24. Of course, multi-purpose connectors which operate in more than one operational mode may also be used, as will be appreciated by those of skill in the art.

In addition, the interface connector 23 can be remotely located with respect to the host device 21, but it need not be. That is, in some embodiments the interface connector 23 can be incorporated within the host device 21 or carried by a housing thereof, as will also be appreciated by those of skill in the art. Additionally, in some embodiments the interface connector 23 may be incorporated into a smart card integrated chip, reducing the connector essentially to a pass through connector, as will also be appreciated by those of skill in the art.

The emulator 24 illustratively includes emulation circuitry 25 for performing (i.e., emulating) the various smart card applications that are ultimately to be implemented in the final smart card product (e.g., a smart card integrated circuit) in any desired operational modes. For example, a smart card may have an embedded operating system capable of managing multiple concurrent (and embedded) applications (e.g., Java applets). These embedded applications may work in cooperation with the host-side applications (e.g., user log-in and authentication applications, Internet-based banking applications, digital rights management applications for audio/video transfer, etc.). Of course, numerous other applications may also be used in accordance with the present invention, as will be appreciated by those skilled in the art.

The emulator 24 also illustratively includes a smart card connector 26 to be connected to the interface connector 23. In particular, the illustrated smart card connector 26 includes a smart card body 27, a connector module 28 carried by the smart card body, and contacts 29 on the connector module for providing the electrical connection between the emulation circuitry and the interface connector 23.

In the exemplary embodiment, the connector module 28 is for a smart card form factor. In addition to a card form factor, in some embodiments the connector module 28 could be for a SIM or "token" type form factor, as will be appreciated by those of skill in the art. In any case, the same connector module 28 may be used for connection with a common ISO and USB reader type. For example, a standard ISO smart card connector module 28 with eight contacts 29 may also be used for connecting the emulator 24 with a USB interface connector, as will be explained further below. Of course, it should be noted that other connector/contact types may also be used in accordance with the present invention, such as a USB type A (or miniature type A) connector module 28, for example.

The emulator 24 also illustratively includes first and second cable assemblies 30, 31 having first ends connected to the emulation circuitry 25, and an interface device 32 connected between second ends of the cable assemblies and the smart card connector 26. The interface device is for selectively electrically connecting a selected cable assembly 30, 31 to predetermined ones of the contacts 29 based upon the operational mode of the smart card reader 23.

In particular, each cable assembly 30, 31 is used for signal communications during a respective operational mode of the emulation circuitry 25. That is, when the emulation circuitry 25 is operating in a first operational mode, it will communicate with the interface connector 23 via the first cable assembly 30, and when it is in the second operational mode it will communicate via the second cable assembly 31, as will be explained further below.

The cable assemblies 30, 31 illustratively include l and m signal lines, respectively, which may be the same number (or not) depending on the operational modes being implemented. Moreover, a number n of the contacts 29 may also be different (or the same) as the number of signal lines l, m. That is, in some embodiments, there may be more contacts 29 than are needed for one or more of the operational modes, as will also be explained further below.

The interface device 32 illustratively includes mode detection circuitry 35 connected to the contacts 29 for detecting the operational mode of the interface connector 23. In addition, the interface device 32 also illustratively includes switching circuitry 36 connected to the mode detection circuitry 35 for selectively electrically connecting the selected cable assembly 30, 31 to the predetermined ones of the contacts based upon the detected operational mode.

It will therefore be appreciated that with the smart card emulator 24 of the present invention, multiple smart card connectors 26 need not be used to provide multiple smart card operational modes. This is because the interface device 32 advantageously detects the operational mode of the interface connector 23 and performs the appropriate signal switching based thereon. Consequently, separate "pods," which would otherwise be required for each cable assembly of a multi-mode smart card emulator, may be avoided.

The foregoing will be further understood with reference to a particular dual mode ISO/USB embodiment of the emulator 24' illustratively shown in FIG. 2. As will be appreciated by those skilled in the art, the ISO 7816-2 specification requires up to eight connections C1–C8 between the interface connector 23 and the ISO smart card. In the illustrated example, the connections C1–C8 correspond to contacts $29a'$–$29h'$, respectively. The contact $29a'$ (C1) is assigned to the supply voltage Vcc, the contact $29b'$ (C2) is assigned to the reset signal RST, the contact $29c'$ (C3) is assigned to the clock signal CLK, the contact $29e'$ (C5) is assigned to the GND reference voltage, the contact $29f$ (C6) is assigned to the variable supply voltage VPP, and the contact $29g'$ (C7) is assigned to data input/output (I/O).

In synchronous ISO 7816-10 applications, under type-2 operating conditions the contact $29d'$ (C4) is assigned to function code FCB, and the contact $29h'$ (C8) may also be used for other synchronous applications. Of course, the contact assignments may be different for different implementations, and not every contact $29a'$–$29h'$ is required for each implementation. For example, an asynchronous ISO smart card under class-B operating conditions does not require the voltage VPP on the contact $29f$ (C6), whereas an asynchronous smart card under class-A operating conditions does. Further, a synchronous smart card under certain operating conditions may assign the contact $29h'$ (C8) to a fuse-zapping capability, for example.

On the other hand, USB operation generally requires only four signal connections between the host device 21 and the emulation circuitry 25'. In particular, the USB Specification calls for dedicated lines for an operating voltage Vbus and ground GND. Thus, when in a USB operational mode, these signals can be mapped to the ISO supply voltage Vcc contact $29a'$ (C1) and the ISO ground GND contact $29e'$ (C5), respectively, for example. Similarly, the USB Specification also requires the use of differential data signal lines D+ and D−, which can be mapped to the contacts $29d'$ (C4) and $29h'$ (C8), for example. The contacts $29c'$ (C3), $29f$ (C6), and $29g'$ (C7) may be used for USB mode selection or other functions, for example. Of course, other mappings may be used as well, as will be appreciated by those skilled in the art.

For basic USB operation, the USB cable assembly 30' will require Vbus, GND, D+, and D− signal lines, while basic ISO operation will require that the ISO cable assembly 31' include Vcc, GND, RST, CLK, and I/O signal lines, as illustratively shown. Of course, additional lines may be included for connection to any of the other contacts noted above if desired for a given application. As noted above, because of the varying requirements for USB and ISO cabling, it will likely be more cost effective to use separate "off-the-shelf" USB and ISO cable assemblies 30', 31', although such cable assemblies may be combined within a single bundle in some embodiments, if desired.

The interface device also illustratively includes a USB transceiver 37' and an ISO transceiver 38', and the emulation circuitry 25' illustratively includes corresponding USB and ISO transceivers 39', 40' for communicating therewith, respectively, over the above-noted signal lines when in the USB or ISO operations modes. Here again, it will likely be more cost effective to use separate off-the-shelf USB/ISO transceivers because of their individual signal requirements, but a custom combination transceiver could potentially be used in some embodiments, and even perhaps with different operational modes.

The emulation circuitry 25' also illustratively includes a field programmable gate array (FPGA) 41' for performing the various smart card applications to be implemented in the final integrated circuit, as noted above. Of course, it will be appreciated by those skilled in the art that other suitable circuitry may also be used.

In the exemplary embodiment of the emulator 24', each of the contacts $29a'$–$29h'$ is illustratively shown as being connected to the mode detection circuitry 35', but they need not be in all embodiments. Moreover, in some embodiments it may be desirable to include a mode select switch 42' with the interface device 32' connected to the mode detection circuitry 35' so that a user can manually select a desired operational mode for the emulation circuitry 25'.

If the mode select switch 42' is included in a given embodiment, the mode detection circuitry 35' need not perform the "automatic" detection operation noted above, which would essentially simplify the mode detection circuitry to a simple interface or connection between the switch and the switching circuitry 36'. Of course, such functionality may also be included along with the switch 42', as illustratively shown, to enhance flexibility and ease of use in numerous emulation environments. By way of example, the mode select switch 42' may be a single-pole, single-throw (SPST) switch, although other suitable switches may also be used.

Depending upon the given operational modes the emulation circuitry 25 is to support, the implementation of the mode detection circuitry 35 and switching circuitry 36 may vary somewhat. By way of example, the mode detection circuitry 35 may be implemented using the appropriate control logic, for example, FPGA or other circuits, configured to perform the detection (and optional security) functions noted above. The various circuitry of the interface device 32 may be implemented on a circuit board, for example, which accommodates the various tolerances of the supported operational protocols, as will be appreciated by those skilled in the art. It may be desirable in some embodiments to support the "legacy" ISO emulation, complete with physical and electrical specifications adherence, as will also be appreciated by those skilled in the art.

With respect to the switching circuitry 36, certain design considerations could be taken into account depending on the given embodiment. For the case of a dual USB/ISO implementation, the ISO and USB specifications define the physical electromechanical mechanisms by which a connection is made between a smart card and reader (ISO) and a device and a hub (USB). (It should be noted that the term "smart card reader" as used herein includes not only ISO readers but also USB "hubs" as well as other similar connection devices for different operational protocols).

Generally speaking, the switching circuitry 36 could include analog switches which allow two (or more) different interfaces to be connected with a common terminating adapter (although digital switching may be used in some embodiments). As such, these analog switches should be appropriately designed for the particular operational modes in question to provide adherence to the electrical specifications (voltages, current, waveform shape and dispersion, etc.) of the various protocols, as will be appreciated by those of skill in the art.

U.S. patent application Ser. No. 09/686,327 to Fruhauf et al., which is assigned to the assignee of the present invention and is hereby incorporated herein in its entirety by reference, discloses a dual-mode smart card including circuitry for use in detecting ISO or non-ISO (i.e., USB) operation, and for routing signals appropriately based thereon. Similar circuitry may also be used in accordance with the present invention for the mode detection circuitry 35 and/or switching circuitry 36, as will be appreciated by those skilled in the art, although other suitable circuitry may also be used.

Although the invention has been described with particular reference to a dual USB/ISO implementation, it will be appreciated that the emulator 24 of the present invention may be used for other exemplary operational modes, as well as more than two operational modes. Other exemplary operational modes or protocols that may be implemented in accordance with the invention include FireWire/FireWire2, Ethernet, 10/100/1000BaseT, fiber optics, fiber channel, etc. Generally speaking, the present invention is well suited for technologies which attempt to move data in a serial fashion at relatively high data rates, as well as others.

Numerous advantages and features of the invention will be apparent from the foregoing discussion. First, the emulator 24 provides for relatively seamless integration of an HWE into a real-world usage model without undue multiplication of adapters and cabling. As such, the present invention provides a cost-effective solution to reducing the amount of redundant external clutter (i.e., cables, pods, terminating adapters, etc.), while still addressing the physical, electrical, and mechanical requirements of the various interfaces between the HWE and the expected reader devices. As such, the emulator 24 may advantageously allow relatively simple and easy transition between these interfaces from the end-user perspective, plus make these transitions in a relatively seamless fashion to the functionality that is embodied inside the emulator 24, and with relatively little custom design work to implement.

Figure 4:
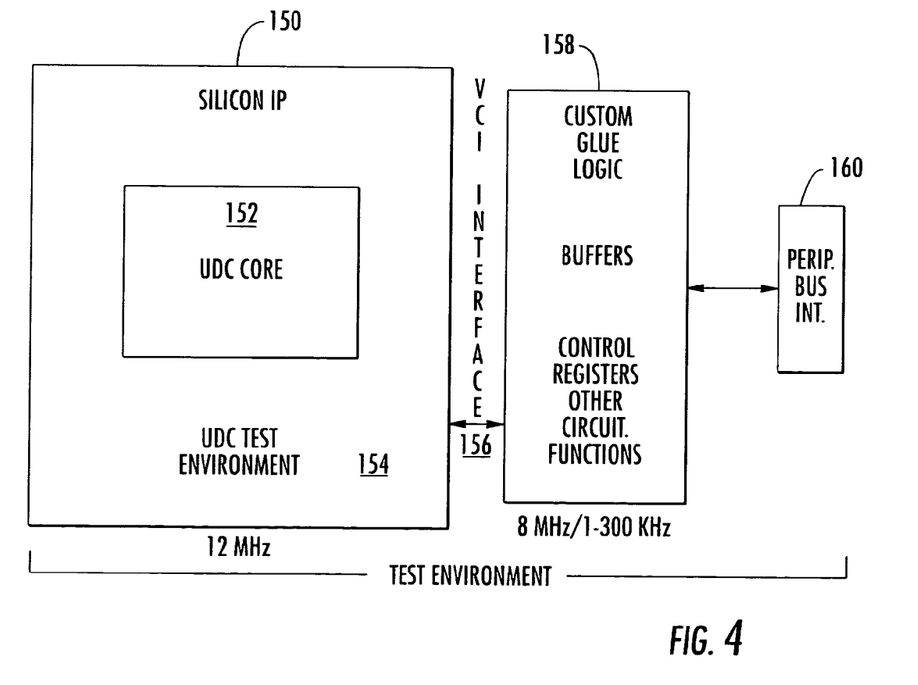
FIG. 4 is another block diagram of a test environment showing a functional block having a USB device core (USD), a virtual component interface (VCI), a custom functional block having glue logic, control registers, buffering and other circuit functions, and a peripheral bus interface for a smart card microprocessor.

Referring now to FIGS. 3 and 4, the dynamic buffering of the present invention is set forth relative to the following description. It should be understood that the present invention can use different emulation tool sets, for example, the Mentor Graphic Celaro Hardware Emulator that is rated for up to 500 MHz. A personal computer functioning at real-world speeds can also be used. An anticipated real-world speed is about 150 to about 300 KHz. Another tool set for emulation could include a customized stand-alone emulator with a modified design to accept a full speed USB device controller, and an analog transceiver with an anticipated real-world speed of about 10.

With the hardware emulator, a virtual model of the system can be created inside the hardware emulator and operated in real time for seconds, minutes or longer as verification. The hardware emulator can use a multi-user project resource with millions of gate capacity and a fully automated flow for Register Transfer Logic (RTL) designs and memory interfacing for RTL memories. The system is operable with different clock domains, uses an expanded, on-board, dual port design memory of many megabytes with embedded multi-port memory.

FIG. 3 shows two functional blocks 100, 102 as virtual components labeled respectively Block A and Block B, and an asynchronous interface as a virtual component interface (VCI) 104, 106 added to each top-level functional block, which can be a functional sub-block depending on the circuit design. Functional Block B 102 includes a USB connection 110, a USB device core (UDC) 112, and a synchronization block 114, interface 106. Functional Block A 100 includes a virtual component interface 100, a custom logic block 120, and a CPU bus interface 122 operable with a CPU 124, for example, a 32 byte RISC processor, such as the ST22MPU used as a smart card processor as manufactured by STMicroelectronics.

The dynamic functional buffering block 130 is labeled Block C and can be a virtual component block that is inserted between Block A and Block B to act as a dynamic buffer. It also includes asynchronous interfaces, which in one embodiment of the present invention, are virtual component interfaces 132, 134. The functional buffering Block C 130 includes custom glue logic, control registers and buffers designated generally at 136. The inclusion or exclusion of the functional buffering block 130 can be managed by a compile-time flag with no other modification required to the main design. The inclusion of the functional buffering block 130 into the design makes it possible for the emulation environment to function properly. It can be rendered in field programmable gate arrays (FPGA) or a physical adapter card, as required.

The functional buffering block 130 can be connected to functional Block A on one side and to functional Block B on the other side. In this example, the virtual component interface is used because of its flexibility and range of operation.

When used in an emulation environment, the local logic in the functional buffering block manages the buffering contents and provides a conduit between Blocks A and B. The exclusion of the functional buffering block 130 makes it possible to directly connect functional Blocks A and B using the virtual component interface to manage the asynchronous interface between the two functional Blocks A and B. The synchronization block within functional Block B ensures that the USB device core (UDC) can be run at-speed and that functional Block A can operate from a nominal speed up to its final silicon specified speed.

A test environment is shown in FIG. 4 and shows silicon IP 150 such as provided by in Silicon Corporation of San Jose, Calif. The UDC core 152 as part of a UDC test environment 154 is operable with the VCI interface 156 to the custom glue logic, buffers, and control registers of the functional buffering block 158 and operable with a peripheral bus interface (P-bus) 160 of the microprocessor. The UDC core 152 is operable at 12 MHz and the custom glue logic, buffers, and control registers could be operable at 8 MHz/1–300 KHz. It is possible to use a UDCVCI. It is possible to extend the existing custom front-end and reuse the P-bus interface and add VCI light control to manage a USBVCI. The custom glue logic could run at 30 MHz and provide useful capability. The VCI interface to the UDCVCI could handle any required synchronization between the app_clk (30 MHz) and the dev_clk (12 MHz). It is possible to have replacement of the DPLL for clock recovery logic.

There is also some enhanced functional operation that could occur relative to endpoint control. Whether a VCI or no VCI is used has little bearing on how the system is able to anticipate more accurately which endpoint can be chosen for an IN transaction. A tri-buffer data buffering system may include different buffers. A first buffer receives data from the UDC and outputs to an OS/resident application. Second and third buffers receive data from the OS/resident application and transfers it to the UDC.

At present, any two of three buffers could be "paired" for an IN endpoint data, where an IN is expected. It is not always known which endpoint the IN will address. Thus, if buffer #2 is busy, then buffers #1 and #3 could be used for queuing the IN data for two different endpoints.

A rotating triple buffer scheme is also possible. The OS will hedge on which IN will come first, and pre-load two buffers in advance. If an OUT comes right before the anticipated IN, and if the OUT is sending greater than 64 bytes, one of the pre-loaded IN buffers could be destroyed. It is not always possible to determine this. A quad-buffer scheme better deals with this sort of situation with first and second buffers operative together and third and fourth buffers operative together.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An emulator for a smart card device comprising:
   at least two virtual components as functional blocks of a smart card device and operative in different clock domains wherein a first functional block comprises a USB device core (UDC) and synchronization block for synchronizing high speed UDC operation and a second functional block in communication therewith comprises a custom logic block and bus interface;
   a functional buffering block operative for communicating with the functional blocks and buffering between the functional blocks and allowing emulation; and
   a smart card connector having contacts and an interface connector connected thereto and operative in a dual mode function, mode detector circuitry operative with the smart card connector for detecting a mode of operation, and a switching circuit operative with the mode detection circuitry and smart card connector and operative for selectively electrically connecting predetermined contacts of the smart card connector based on a detected mode of operation.

2. An emulator according to claim 1, wherein each of said functional blocks further comprises asynchronous interfaces for communicating with each other.

3. An emulator according to claim 1, wherein each of said functional blocks further comprise virtual component interfaces for communicating with each other and/or the functional buffering block.

4. An emulator according to claim 1, wherein said functional buffering block further comprises virtual component interfaces for communicating with the functional blocks.

5. An emulator according to claim 1, wherein said functional blocks comprise asynchronous interfaces for communicating with said functional buffering blocks.

6. An emulator according to claim 1, wherein said functional buffering block further comprises local logic for managing the buffering between functional blocks.

7. An emulator according to claim 1, wherein said functional buffering block is excluded or included for buffering by a compile-time flag.

8. An emulator according to claim 1, and wherein said functional buffering block further comprises a plurality of control registers.

9. An emulator for a smart card device comprising:
   at least two virtual components as functional blocks of a smart card device and operative in different clock domains and having asynchronous interfaces for communicating with each other wherein a first functional block comprises a USB device core (UDC) and synchronization block for synchronizing high speed UDC operation and a second functional block in communication therewith comprises a custom logic block and bus interface;
   a functional buffering block operative for communicating with the functional blocks and selectively buffering between the functional blocks and allowing emulation; and
   a smart card connector having contacts and an interface connector connected thereto and operative in a dual mode function, mode detector circuitry operative with the smart card connector for detecting a mode of operation, and a switching circuit operative with the mode detection circuitry and smart card connector and operative for selectively electrically connecting predetermined contacts of the smart card connector based on a detected mode of operation.

10. An emulator according to claim 9, wherein each of said functional blocks further comprises virtual component interfaces for communicating with each other and/or with the functional buffering blocks.

11. An emulator according to claim 9, wherein said functional buffering block further comprises virtual component interfaces for communicating with the functional blocks.

12. An emulator according to claim 9, wherein said functional buffering block further comprises local logic for managing the buffering between functional blocks.

13. An emulator according to claim 9, wherein said functional buffering block is excluded or included for buffering by a compile-time flag.

14. An emulator according to claim 9, wherein said functional buffering block further comprises a plurality of control registers.

15. A method for emulating a smart card device comprising the steps of buffering data between virtual components as functional blocks of a smart card device and operative in two different clock domains; and
   buffering between a first functional block as a USB device core (UDC) and a second functional block as a custom logic block and bus interface and synchronizing high speed operation of the UDC using a synchronization block; and
   switching into a detected mode of operation using a smart card connector having contacts and an interface connector connected thereto and operative in a dual mode function, mode detector circuitry operative with the smart card connector for detecting a mode of operation, and a switching circuit operative with the mode detection circuitry and smart card connector and operative for selectively electrically connecting predetermined contacts of the smart card connector based on a detected mode of operation.

16. A method according to claim 15, and further comprising the step of buffering through asynchronous interfaces between the functional blocks.

17. A method according to claim 15, and further comprising the step of buffering through virtual component interfaces.

18. A method according to claim 15, and further comprising the step of buffering through a functional buffering block added between two functional blocks operative in different clock domains.

19. A method according to claim 18, and further comprising the step of managing the buffering by local logic contained within the functional buffering block.

20. A method according to claim 18, and further comprising the step of managing the inclusion or exclusion of the functional buffering block using a compile-time flag.

21. A method for emulating a smart card device comprising the steps of:
   providing virtual components as functional blocks of a smart card device and operative in different clock domains; and
   buffering between the functional blocks for allowing emulation; and
   buffering between a first functional block as a USB device core (UDC) and a second functional block as a custom logic block and bus interface and synchronizing high speed operation of the UDC using a synchronization block; and switching into a detected mode of operation using a smart card connector having contacts and an interface connector connected thereto and operative in a dual mode function, mode detector circuitry operative with the smart card connector for detecting a mode of operation, and a switching circuit operative with the mode detection circuitry and smart card connector and operative for selectively electrically connecting predetermined contacts of the smart card connector based on a detected mode of operation.

22. A method according to claim 21, and further comprising the step of buffering through asynchronous interfaces between the functional blocks.

23. A method according to claim 21, and further comprising the step of buffering through virtual component interfaces.

24. A method according to claim 21, and further comprising the step of buffering through a functional buffering block added between functional blocks operative in different clock domains.

25. A method according to claim 24, and further comprising the step of managing the buffering by local logic contained within the functional buffering block.

26. A method according to claim 24, and further comprising the step of managing the inclusion or exclusion of the functional buffering block using a compile-time flag.

* * * * *